United States Patent
Broccardo et al.

[11] 3,901,116
[45] Aug. 26, 1975

[54] TWO BLADED SAW TO CUT BARS WHEREIN THE BLADES MOVE IN OPPOSITE DIRECTIONS

[76] Inventors: Ernesto Broccardo, Via G. Marconi; Giovanni Grasselli, Via Maglio 44; Elvio Rizzato, Via G. Marconi; Antonio Grasselli, Via Maglio 44, all of Santorso (Vicenza); Adriano Serman, Via Ponte Timonchio 1, Schio (Vicenza), all of Italy

[22] Filed: Dec. 10, 1973

[21] Appl. No.: 423,467

[30] Foreign Application Priority Data
Dec. 13, 1972  Italy.................................. 85663/72

[52] U.S. Cl. .................... 83/751; 83/558; 83/647; 83/758; 83/776
[51] Int. Cl.² ........................................ B23D 49/02
[58] Field of Search ............ 83/751, 519, 516, 517, 83/556, 558, 755, 757, 758, 776, 647

[56] References Cited
UNITED STATES PATENTS
2,412,311  12/1946  Ziska ................................ 83/647 X Primary Examiner—J. M. Meister
Attorney, Agent, or Firm—Bucknam and Archer

[57] ABSTRACT

A two-bladed saw comprises two parallel blades mounted on a frame, the two blades advancing from opposite directions and being subject to an alternating movement transverse to the axle of the blade and means for regulating the motion of each of the blades, so that one blade effects a useful work run while the other blade is on the idle return run. By means of the two-bladed saw, it is possible to reduce the total cutting time because the element to be cut, is cut from two opposite sides and at each work run only one blade is in contact with the metal, while the other blade is on its return run.

8 Claims, 4 Drawing Figures

TWO BLADED SAW TO CUT BARS WHEREIN THE BLADES MOVE IN OPPOSITE DIRECTIONS

This invention is designed to effect a method of carrying out the cutting of metallic bars, sectional or similar, by means of two blades moving in opposite directions, which work on two opposite sides of the bar, greatly reducing the total cutting time.

The invention also embraces the two bladed saw with which this method is carried out.

As is stated herein the cutting of the metallic bars or sections is effected by means of saws, fitted with a cutting blade having reciprocating motion and which advances along the cutting line to an extent pre-set as required.

The time required to effect the complete cutting of the bar is subject to the characteristics of the material from which the bar itself is made, to the characteristics of the steel from which the cutting blades are made and to the maximum temperature, which should not be exceeded, as well as the dimensions of the bar to be cut.

Once the speed of approach of the cutting blade is set, according to the principles indicated above, the total time required to effect the cutting of the bar is also therefore determined.

The object of this invention is to obtain an apparatus which allows, in line with the conditions, the decrease of total cutting time, hence a doubling of hourly production of each machine, or if preferred, the decrease of the number of machines necessary to reach a specified production.

The apparatus employed in this invention anticipates that the piece to be cut would be subject to the action of two parallel cutting blades, which obviously work on the same cutting level, but advancing from opposite directions, until the cutting of the member is completed.

The two blades are subject to alternating movements, controlled to a pattern by a pair of gears of connecting rod and lever, synchronised with the displacement movements transversal to the cutting line, alternatively at opposite ends and simultaneously for both the blades, so that at each work run only one blade is in contact with the metal to be cut while the other is on its return run.

The cutting therefore proceeds simultaneously in two opposite directions, starting from two opposite sides of the bar to be cut, until arriving at the middle of same, where, with a final run, one of the two blades cuts the remaining diaphragm between the two cuts so far made.

It is evident therefore that, according to the number of work runs of one of the cutting blades, it is possible to halve the total cutting time of a specific metallic bar or section to be cut.

A two bladed saw, suitable for the purpose of carrying out the procedure for which this invention is designed, will now be described in more detail, with the aid of the accompanying diagrams, in an embodiment defined under common claim of unlimiting pattern, being able obviously also to assume different shapes and configurations without departing from the scope of the patent. Being:

Figure 1:
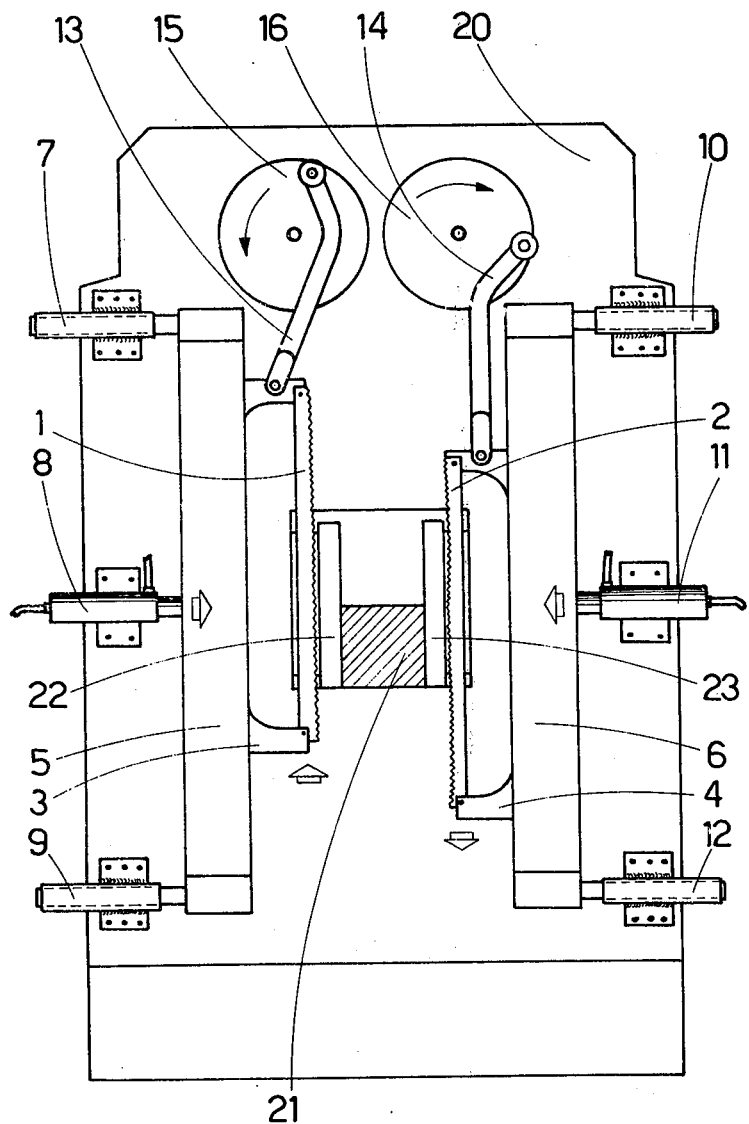
FIG. 1 (Plate I) shows a full front view of the machine.

The machine illustrated in the accompanying diagrams, incorporates the two cutting blades 1 and 2 (FIG. 1) mounted on the supporting frames 3 and 4, gliding on the guides 5 and 6, in their turn held by the supports of guide 7 and 9 by guide 5 and 10 and 12 by guide 6 and the movements of advance are controlled by the hydraulically controlled cylinders 8 for the guide 5 and 11 for the guide 6.

The frames 3 and 4 are attached, respectively by means of connecting rods 13 and 14, with the fly-wheel levers 15 and 16, placed in rotation, in opposite directions, from an electric control motor 17 (FIG. 2) by means of suitable mechanical transmissions, including a driving belt 18 and connections to the gears, included within housing 19.

Figure 2:
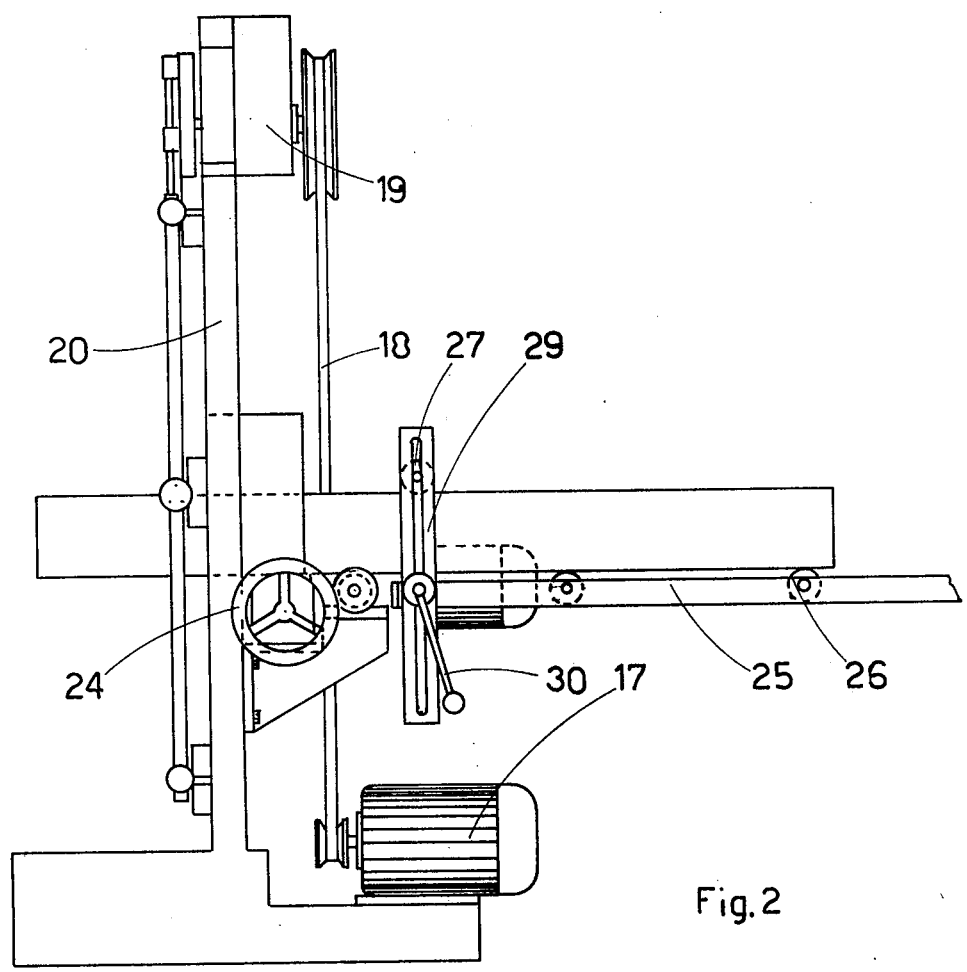
FIG. 2 (Plate II) shows a full side view of same.

The whole complex, including the hydraulically controlled cylinders 8 and 11, the guides 7, 9, 10 and 12, the fly-wheel levers 15 and 16, and the housing 19, is mounted on a vertical plate 20, fitted with a central aperture across which passes the bar to be cut 21, withheld from the teeth 22 and 23 by a blocking vice, controlled by the fly-wheel 24 (FIG. 2).

A guiding frame 25 (FIGS. 2 and 3) fitted with supporting rollers 26, offers support to the bar 21, held above by roller 27, mounted in an adjustable position on lateral supports 28 and 29, attached to the frame 25, in a position which is adjustable by the control lever 30.

Figure 4:
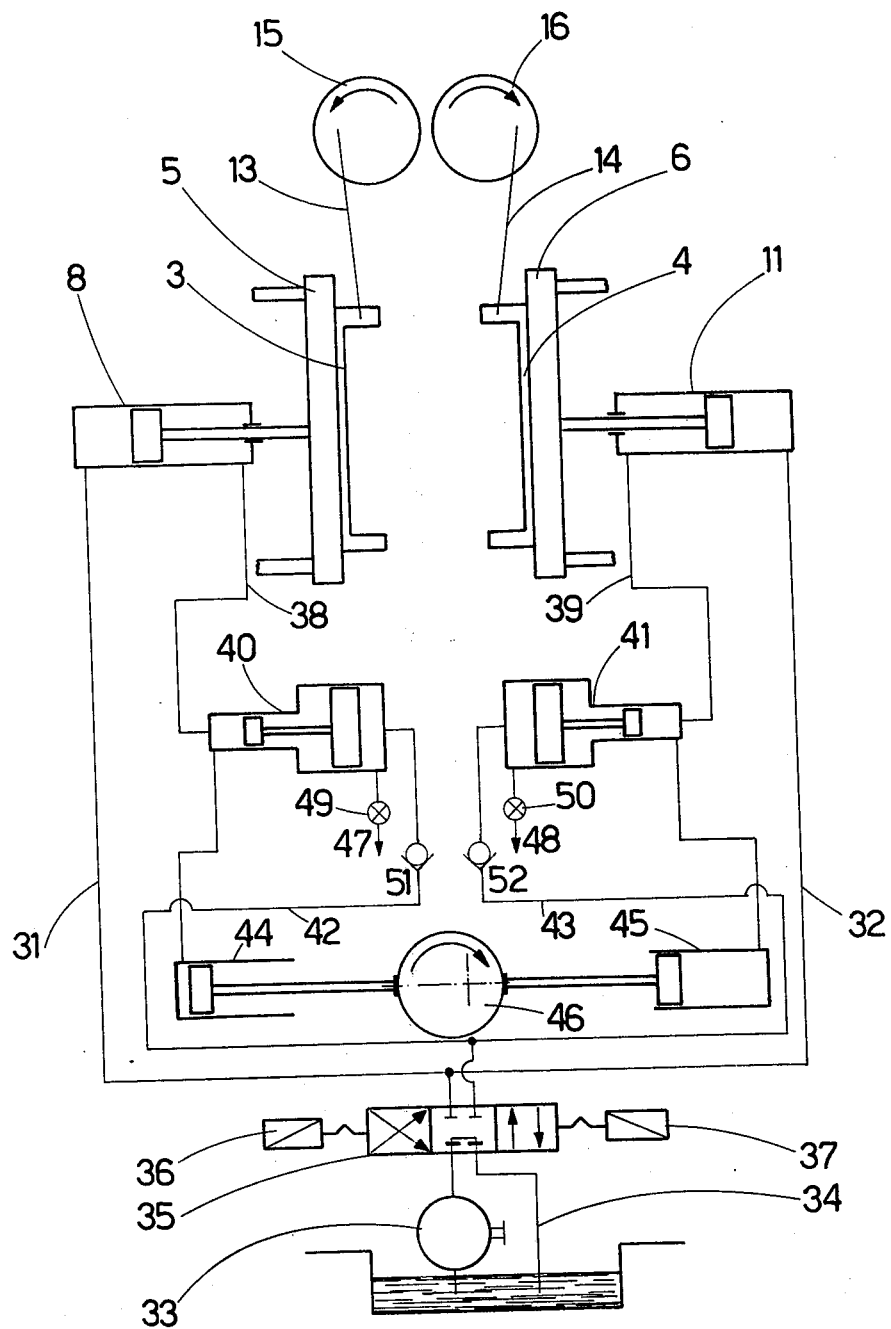
FIG. 4 (Plate III) shows the hydraulic plan for the supply to the pneumatic cylinders for the control of the advance movement of the machine.

The controlling hydraulic circuit is illustrated in FIG. 4.

Shown diagrammatically are the blade supports 3 and 4, attached by means of the connecting rods 13 and 14, to the fly-wheel handles 15 and 16.

The hydraulic cylinders 8 and 11, control the transverse movement of the guides 5 and 6, and consequently of the frames 3 and 4.

The anterior chambers of cylinders 8 and 11 are attached hydraulically, by means of conduits 31 and 32, to the middle of the oil pump 33 or, respectively to the discharge conduit 34, across the distributor 35, controlled by the electrical valves 36 and 37.

The posterior chambers of cylinders 8 and 11 are attached vice versa, through conduits 38 and 39, with the anterior chambers of the smaller diameter of the differential cylinders 40 and 41, by which the posterior chambers of greater diameter are in their turn attached, by means of conduits 42 and 43, with the discharge conduit 34 or with the oil pump 33, according to the position of the distributor 35.

Attached to the anterior chamber of the minor diameter of the differential cylinders 40 and 41 are cylinders 44 and 45, of which the pistons are attached with the eccentric fly-wheel 46, in diametrically opposite positions, so that while one of the pistons is being pulled the other is being pushed or vice versa.

The speed of rotation of the eccentric fly-wheel 46 is synchronised with that of the fly-wheel levers 15 and 16 so that when one of the cutting blades, for example that held by frame 3, is returning, the piston of cylinder 8 of which the posterior chamber is pressurised by cylinder 44, frame 3 is operated in order to remove the blade from the member being worked.

Simultaneously the blade held by frame 4 is brought towards the member being worked by the piston of cylinder 11, of which the anterior chamber is kept under pressure from the oil pump 33, while the posterior chamber is attached to cylinder 45 in which is discharged the oil under pressure.

The hydraulic circuit containing the posterior chamber of cylinder 8, the conduit 38 and the chamber of cylinder 44 is held under pressure by the differential cylinder 40, of which the posterior chamber of the major diameter is attached to the distributor 35 by means of the conduit 42, into which is inserted the retaining valve 51.

The hydraulic circuit containing the posterior chamber of cylinder 11, the conduit 39 and the cylinder 45 is held under pressure by the differential cylinder 41, of which the posterior chamber of the major diameter is attached to the distributor 35 by means of conduit 43, into which is inserted the retaining valve 52.

The two conduits 47 and 48 supplied with regulating valves fixed from range 49 and 50, carry out discharge of the oil contained in the posterior chambers of differential cylinders 40 and 41, determining the slow advance of the work of the cutting blade.

Distributor 35 has three possible working positions; the first, described in illustration, corresponding to the inactive condition of the electromagnets 36 and 37 into which the pump 33 discharges directly the oil in the reservoir through conduit 34, without using the hydraulic circuit of the machine which remains detached.

In the second position, corresponding to the active condition of the electromagnet 36 and the crossed joints, the posterior chamber of the differential cylinders 40 and 41 are fed with oil under pressure by means of conduits 42 and 43, across the retaining valves or non returning valves 51 and 52, inducing across the conduits 38 and 39 the supply of the posterior chambers of cylinders 8 and 11, and consequently the opening of frames 3 and 4.

Simultaneously, the oil contained in the anterior chambers of cylinders 8 and 11, returns to the reservoir across the conduits 31 and 32 attached to the discharge conduit 34.

A microswitch placed along the opening of the frames, de-energises the solenoid of the electromagnet 36, thus allowing free regulation of the opening of the frames.

In the third working position of distributor 35, corresponding to the condition of the electromagnet 37, energised and attached to the parallel conduits, the oil under pressure from pump 33, feeds through conduits 31 and 32, the anterior chambers of cylinders 8 and 11, determining thus the advance of frames 3 and 4.

Simultaneously, the posterior chambers of cylinders 6 and 11, across the conduits 38 and 39, cause the pistons of the differential cylinders 40 and 41 to move forward, inducing the discharge into the reservoir of the oil contained in the posterior chambers of same, across the regulating valves 47 and 48.

By means of these valves it is therefore possible to regulate the speed of advance during the course of work of the frames 3 and 4, while the retention and non returning valves 51 and 52 stop the discharge directly into the reservoir of the oil contained in the posterior chambers of the differential cylinders 40 and 41.

At the end of the operation of the cutting the electromagnet 37 becomes de-energised by means of a microswitch controlled by guides 5 and 6, during the course of their work, so that distributor 35 returns to a resting position and the cycle of the machine can then recommence.

Figure 3:
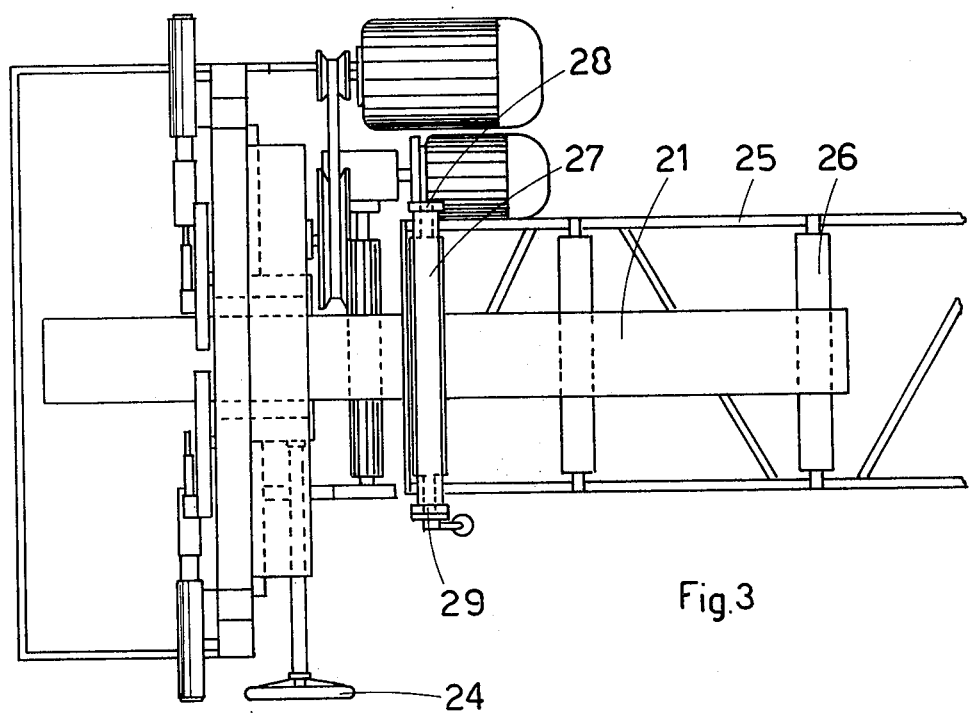
FIG. 3 shows a full view from above of same.

Naturally, the constructional details, whether those mechanical ones illustrated in FIGS. 1 to 3 or those relating to the hydraulic circuit illustrated in FIG. 4 are indicated in a particular embodiment of the illustrated invention under common claim of non limiting pattern and could assume different configurations coming within the essential characteristics of the patent.

It is event in fact that the same movements of slow advance in the work phase, of rapid return in the resting phase and the transverse oscillation of the cutting blades can be obtained through suitable mechanical means, always remaining within the scope of the patent.

We claim:

1. A two-bladed saw to cut metallic bars which comprises two frames, two parallel blades mounted thereon, guide means for advancing the blades from opposite directions towards the bar to be cut, means for controlling the movement of said guide means, means for supporting the bar to be cut, said guide means being capable of an alternating motion transverse to the axle of the blades and imparting alternating motion to the blades, means for synchronizing the advance motion of said blades, whereby when each blade effects a useful work run, the other is on the idle return run.

2. Two bladed saw as claimed in claim 1, characterized by the fact that the alternating movements of the cutting blades are obtained by mechanical means of a connecting rod and fly-wheel.

3. Two bladed saw as claimed in claim 1, characterized by the fact that the alternating movements of the two cutting blades are obtained by means of hydraulic cylinders.

4. Two bladed saw as claimed in claim 1, characterized by the fact that the alternating movements transversal to the axle of the cutting blades, are obtained by means of double action cylinders attached hydraulically with two cylinders, of which the pistons are endowed with alternate movements giving between them 180°.

5. Two bladed saw as claimed in claim 1, characterized by the fact that in the hydraulic circuit including the posterior chambers of the double action cylinders, which control the alternating movements transversal to the cutting blades, differential cylinders are inserted of which the opposite chambers are discharged by means of regulating valves, said differential cylinders controlling the speed of advance of the cutting blades, during the work phase of the machine.

6. Two bladed saw as claimed in claim 5, characterized by the fact that a distributor, controlled by electromagnets, operates the feeding and discharge of the hydraulic circuit, for the purpose of effecting a rapid return run resting position of the cutting blades and the slow advance run of same.

7. The saw according to claim 1 comprising means for regulating the speed of the blades.

8. The saw according to claim 1 wherein the final work run is performed by one blade while the other is on the idle return run.

* * * * *